(12) United States Patent
Parker et al.

(10) Patent No.: US 6,431,195 B1
(45) Date of Patent: Aug. 13, 2002

(54) BUOYANT VENT VALVE

(75) Inventors: Eric G. Parker, Winnetka; Kenneth LeVey, West Chicago; David R. Nowak, Bloomingdale, all of IL (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 09/791,514

(22) Filed: Feb. 23, 2001

(51) Int. Cl.[7] .................................................. F16K 24/04
(52) U.S. Cl. ............................... 137/2; 137/43; 137/202; 137/587
(58) Field of Search ............................ 137/2, 43, 202, 137/493, 578, 587, 860

(56) References Cited

U.S. PATENT DOCUMENTS

| | | | | |
|---|---|---|---|---|
| 223,396 A | * | 1/1880 | Shabley | 137/578 X |
| 2,679,333 A | * | 5/1954 | Starck | 137/578 X |
| 4,142,647 A | * | 3/1979 | Walters | 137/587 X |
| 4,753,262 A | | 6/1988 | Bergsma | |
| 4,960,153 A | | 10/1990 | Bergsma | |
| 5,083,583 A | | 1/1992 | Benjey | |
| 6,116,271 A | | 9/2000 | Nickel | |
| 6,298,873 B1 | * | 10/2001 | LeVey et al. | 137/493 |
| 6,302,137 B1 | * | 10/2001 | Devall | 137/202 |

* cited by examiner

Primary Examiner—Gerald A. Michalsky
(74) Attorney, Agent, or Firm—Pauley Petersen Kinne & Erickson

(57) ABSTRACT

A vent valve for a fuel tank having a sending unit positioned therethrough including a floating body floatable within the fuel tank and a valve positioned with respect to the floating body. A vent hose is positioned with respect to the valve, the vent hose extending between the floating body and the sending unit.

15 Claims, 4 Drawing Sheets

BUOYANT VENT VALVE

BACKGROUND OF THE INVENTION

1. Field of the Invention

This invention relates to a vent valve used in a fuel tank for venting vapor, shutting off fluid flow when the fuel tank is in an overfill condition and preventing fuel leakage in the event of a rollover.

2. Description of Related Art

Fuel tanks, and more particularly vehicle/automobile fuel tanks are subject to a great deal of scrutiny during the design phase. Fuel tanks are formed in complex forming operations involving numerous layers of material that may lose integrity when layer continuity is interrupted. One such interruption takes place when a sending unit is positioned within a sidewall of the fuel tank. The sending unit includes electronics and diagnostics for the operation of the vehicle including a fuel level gauge and/or a fuel pump.

In addition, vent valves are commonly used in fuel tanks to vent excess vapor from an interior of the fuel tank to an exterior of the fuel tank, usually to an external filter. Existing vent valves are primarily rigidly fixed through a sidewall of the fuel tank and comprise a float, spring and flapper valve in an arrangement similar to that shown in U.S. Pat. No. 4,960,153. Such existing vent valves require an interface with the fuel tank in addition to the interface created by the sending unit. These interfaces may become prone to corrosion, leakage and/or other factors that may compromise the safety and integrity of the vehicle.

SUMMARY OF THE INVENTION

Fuel within fuel tanks releases vapors that may be harmful to the environment and create a safety hazard to the occupants of the vehicle. Fuel tanks typically include sending units that are positioned within a sidewall of the fuel tank and contain electronics and diagnostics related to the operation and maintenance of the vehicle.

A vent valve according to a preferred embodiment of this invention is positioned within the fuel and is tethered to a sidewall of the fuel tank, preferably through the existing sending unit. The vent valve is designed to vent fuel vapors from an interior of a fuel tank through a vent hose that extends through the sending unit and ultimately to the exterior of fuel tank, such as to a charcoal filter.

A floating body is preferably incorporated into the vent valve and comprises a buoyant material. A valve is preferably positioned within the floating body. The valve is positioned to open and close depending upon an internal pressure of the fuel tank and/or a level of fuel within the fuel tank and/or a relative position of fuel within the fuel tank.

A vent is preferably positioned with respect to the floating body and further arranged in fluid communication with the valve. The vent preferably creates an outlet for vapor from the vent valve. A vent hose is further positioned with respect to the vent and forms a vapor path from the valve to an exterior of the fuel tank.

The valve may include a valve float having an internally positioned valve channel. The valve float is preferably rotatably positioned within the floating body so that the valve channel within the valve float and correspondingly rotates relative to the floating body. The valve channel is sized to permit vapor to escape through the vent valve but prevent the free flow of fluid through the vent valve.

A check valve is preferably positioned relative to the vent and may include two O-rings positioned to flex and permit either the entry of vapor or the exit of vapor from within the vent valve. The vapor is thereupon directed through the vent hose and to the exterior of the fuel tank. The check valve preferably permits a two way exchange of pressure between the interior and exterior of the fuel tank.

The floating body preferably includes a plurality of channels positioned between the floating body and the valve. In addition, the valve and/or the floating body may include a plurality of baffles to permit passage of vapor from an exterior of the vent valve to an interior of the vent valve.

It is one object of this invention to provide a buoyant vent valve that vents vapor from a fuel tank through a vent hose that passes through a sending unit in a sidewall of the fuel tank.

It is another object of this invention to provide a buoyant vent valve that provides a vent for a fuel tank.

It is another object of this invention to provide a buoyant vent valve that maintains a predetermined pressure range within the fuel tank.

It is yet another object of this invention to provide a buoyant vent valve that will operate across a wide range of temperatures.

It is still another object of this invention to provide a buoyant vent valve that will not allow any fuel to escape from the fuel tank in the event of a rollover or extreme inclination.

It is yet another object of this invention to provide a buoyant vent valve that shuts off all flow when the fuel tank is in an overfill condition.

It is still another object of this invention to provide a buoyant vent valve that works in any orientation and does not require mounting holes in the fuel tank.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

Figure 1:
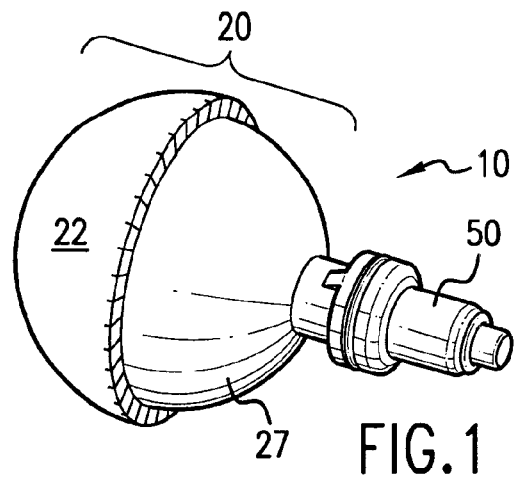
FIG. 1 is a side perspective view of a vent valve according to one preferred embodiment of this invention.
Figure 2:
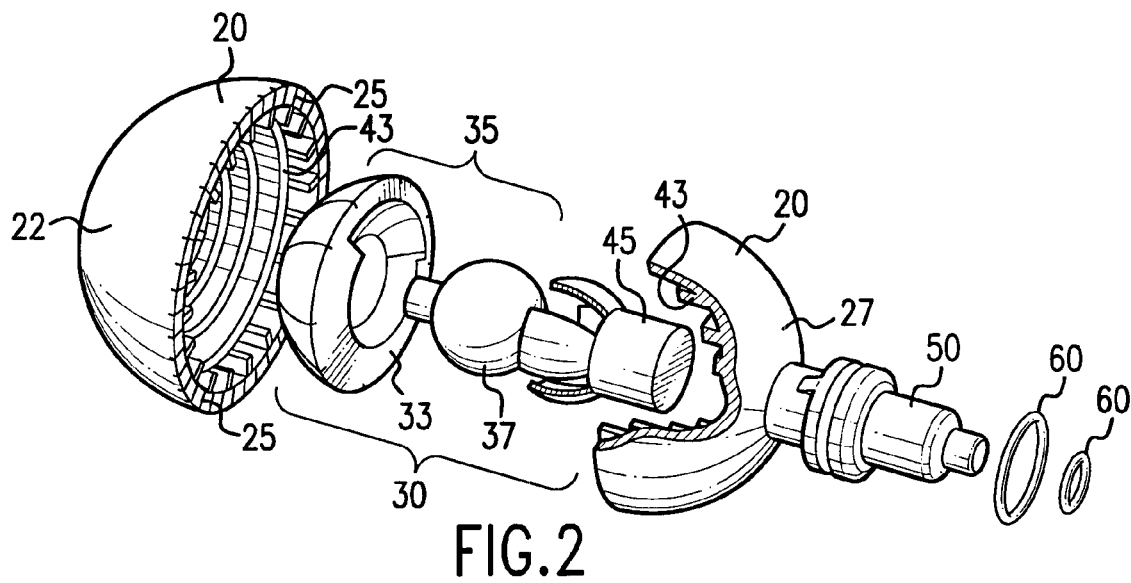
FIG. 2 is an exploded side and partial cutaway view of a vent valve according to one preferred embodiment of this invention.

FIGS. 1 and 2 show vent valve 10 according to one preferred embodiment of this invention. As shown schematically in FIG. 3, vent valve 10 is buoyant within fuel tank 80.

Figure 3:
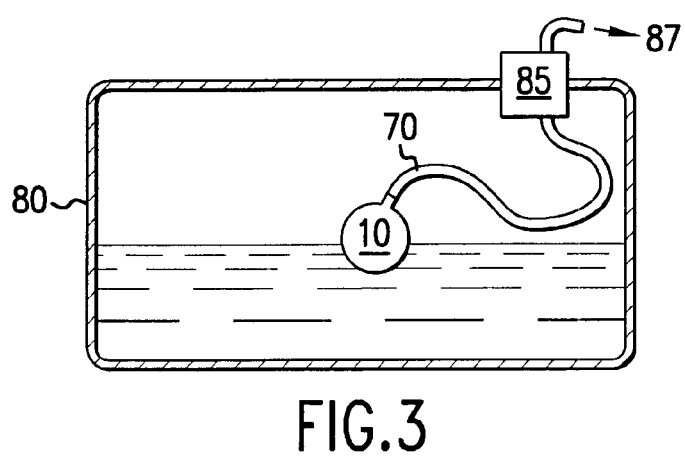
FIG. 3 is a schematic of a vent valve in a fuel tank according to one preferred embodiment of this invention.

As shown in FIG. 3, vent valve 10 is designed to vent fuel vapors from an interior of a fuel tank 80 through a vent hose 70 that extends through sending unit 85 and ultimately to the exterior of fuel tank 80, such as to a charcoal filter 87 (not shown). An overview of several basic elements of vent valve 10 include: floating body 20 floatable within fuel tank 80; valve 30 positioned with respect to floating body 20; and vent hose 70 positioned with respect to valve 30 and extending between floating body 20 and sending unit 85.

Floating body 20 is preferably incorporated into vent valve 10 and comprises a buoyant material that is resistant to the corrosive environment present in a typical fuel tank, particularly a material that is resistant to gasoline.

Valve 30 is preferably positioned with respect to floating body 20. Valve 30 may be positioned at least partially within floating body 20, such as shown in FIG. 2, or completely internal or external to floating body 20, depending upon the preferred embodiment of the invention. Valve 30 is designed to open and close depending upon an internal pressure of fuel tank 80 and/or a level of fuel within fuel tank 80 and/or a relative position of fuel within fuel tank 80.

Floating body 20 may be a unitary component or may include two components, as shown in FIG. 2, such as dome float 22 and body 27. Aside from providing buoyancy, dome float 22 may additionally baffle fluid that is within vent valve 10 from splashing.

Vent 65 is preferably positioned with respect to floating body 20 and further arranged in fluid communication with valve 30. Vent 65 preferably creates an outlet for vapor from vent valve 10. In a static state within fuel tank 80, air and vapor preferably flow freely through floating body 20 and valve 30 and into vent 65.

Vent hose 70 is preferably positioned with respect to vent 65 and forms a vapor path from valve 30 to an exterior of fuel tank 80, as shown schematically in FIG. 3. Vent hose 70 is preferably at least as long enough to permit extension of vent valve 10 to every extremity of fuel tank 80. According to one preferred embodiment of this invention, vent hose 70 is constructed from a buoyant material. In addition, vent hose 70 is preferably constructed of a non-binding, kink-free material and geometry.

According to one preferred embodiment of this invention, valve 30 comprises valve float 35 having an internally positioned valve channel 40. Valve float 35 is preferably rotatably positioned within floating body 20 so that valve channel 40 correspondingly rotates within valve float 35 and relative to floating body 20. Valve channel 40 should be of an appropriate size to permit vapor to escape through vent valve 10 but prevent free flow of fluid through vent valve 10. According to one preferred embodiment of this invention, valve channel 40 is 5 mm in diameter.

Figure 4:
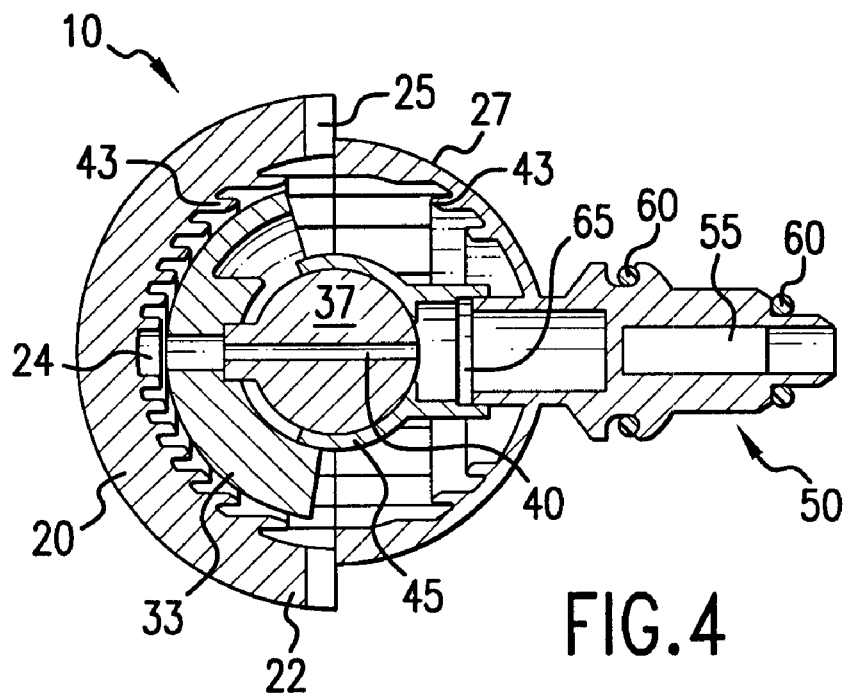
FIG. 4 is a cross-sectional side view of a vent valve according to one preferred embodiment of this invention.

According to a preferred embodiment of this invention, valve 30 is freely rotatable within floating body 20 and positionable between an open position and a closed position. In an open position, such as shown in FIG. 4, valve channel 40 extends between vent 65 and a portion of the sidewall of floating body 20, such as detente 24. In the open position, vapor flows freely from an interior of fuel tank 80 into an interior of vent valve 10 between floating body 20 and valve float 35, through vent channel 40 and then out through vent 65 and vent hose 70.

Valve 30 may further include valve seat 45 fixed with respect to floating body 20 and permitting the rotation of valve float 35 with respect to floating body 20. Valve seat 45 as shown in FIG. 2, partially encloses a portion of valve float 35 to permit rotation of valve float 35 with respect to floating body 20. Valve seat 45 further helps maintain orientation of valve float 35 when fuel tank 80 is not in overfill mode.

Valve seat 45 assists in shutoff of vent valve 10 into a closed position when high angulation of vent valve 10 occurs.

Valve float 35 may comprise a unitary component, or alternatively, as shown in FIG. 2, valve float 35 may comprise a combination of components, such as ball 37 and cap 33. In such an arrangement, as shown in FIGS. 4–7, ball 37 preferably contains valve channel 40. Preferably, a level of fluid within vent valve 10 directly controls movement of valve float 35 relative to floating body 20.

According to one preferred embodiment of this invention, vent valve 10 further comprises body stem 50 for attachment of vent hose 70, such as shown schematically in FIG. 3.

Figure 8:
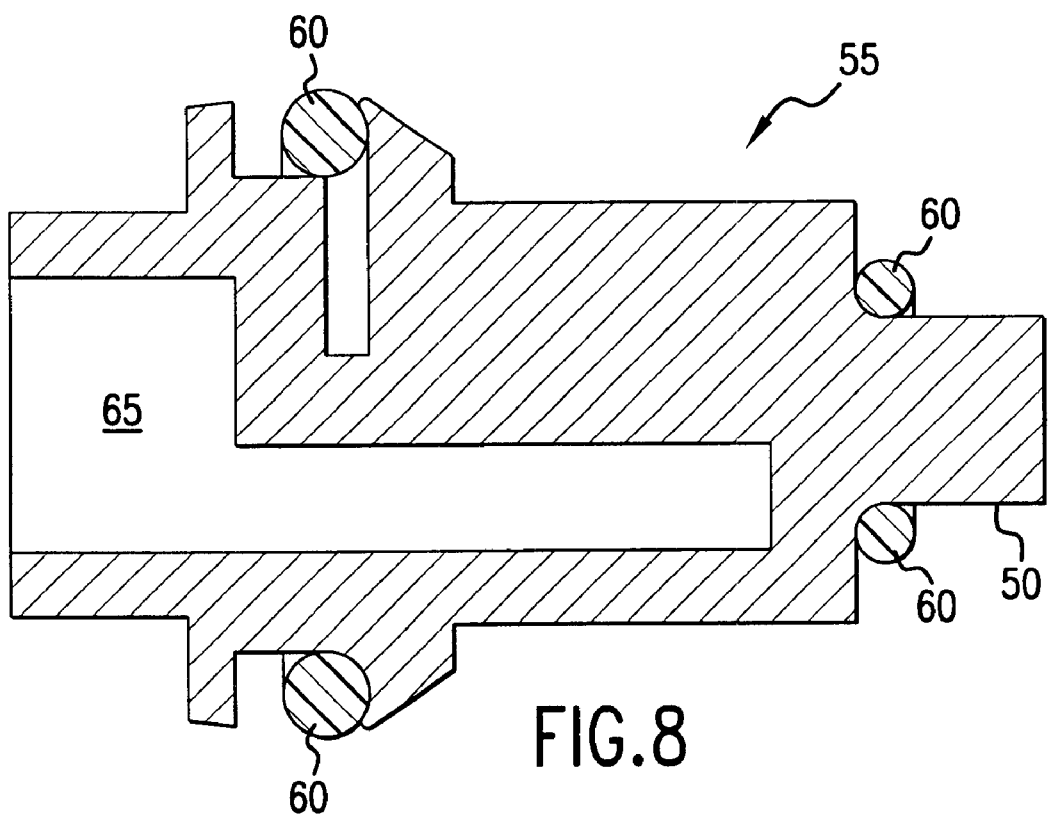
FIG. 8 is a cross-sectional side view of a body stem according to one preferred embodiment of this invention.

Check valve 55, preferably a two-way check valve, is preferably positioned within body stem 50. Check valve 55 according to one preferred embodiment of this invention is shown schematically in FIG. 8. Check valve 55 may include two O-rings 60 positioned along body stem 50, each O-ring 60 positioned to flex and permit either the entry of vapor or the exit of vapor from within vent valve 10. The vapor is thereupon directed through vent hose 70 and to the exterior of fuel tank 80. Such an arrangement as shown schematically in FIG. 8 permits a two way exchange of pressure between the interior of fuel tank 80 and the exterior of fuel tank 80. FIG. 8 does not show the precise arrangement and placement of passages necessary to permit the exchange of vapor between the interior and exterior of fuel tank 80.

As best shown in FIGS. 2–7, floating body 20 preferably includes a plurality of channels 25 positioned between floating body 20 and valve 30. In addition, valve 30 and/or floating body 20 include a plurality of baffles 43 to permit passage of vapor from an exterior of vent valve 10 to an interior of vent valve 10.

In practice, vent valve 10 preferably operates as shown in FIGS. 4–7. FIG. 4 shows a cross-section of vent valve 10 illustrating an open position of vent valve 10. The open position is a position wherein fuel tank 80 is generally level and static. In the open position shown in FIG. 4, valve 30 is floating on the top of fuel, allowing vapor and air to exchange with fuel tank 80. This exchange, and thus the internal pressure of fuel tank 80, is controlled by an operating condition of the automobile or other vehicle.

Figure 5:
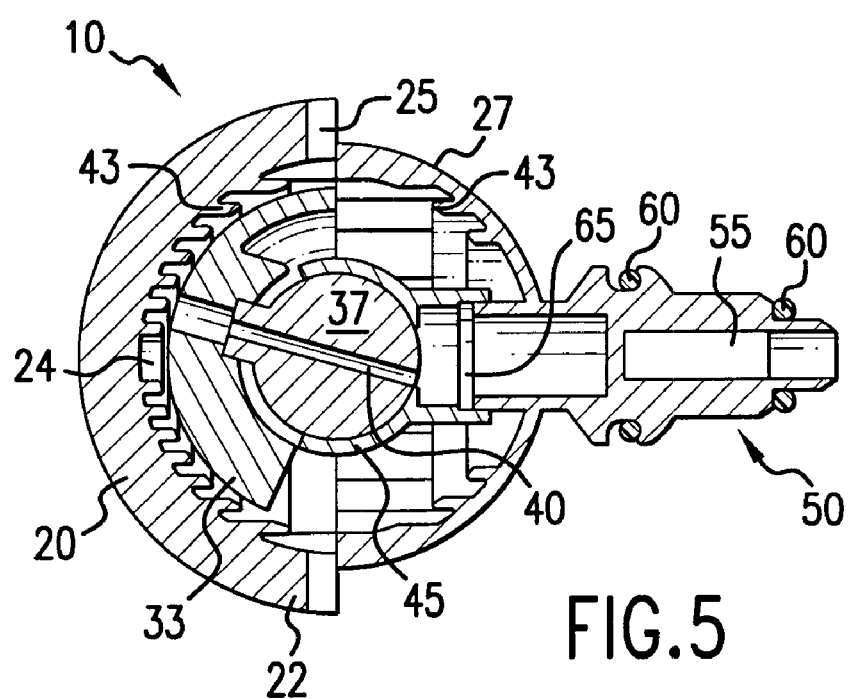
FIG. 5 is a cross-sectional side view of a vent valve according to one preferred embodiment of this invention.

FIG. 5 shows vent valve 10 angulated to a maximum operating position. This position allows for valve 30 to operate within a 30° requirement as mandated by automobile manufacturers. Valve float 35 of valve 30 interacting with fuel level directly effects this angulation. Baffles 43 and a tight clearance between valve float 35 and floating body 20 eliminate or greatly reduce the possibility of fuel splashing into orifice of vent 65.

Figure 6:
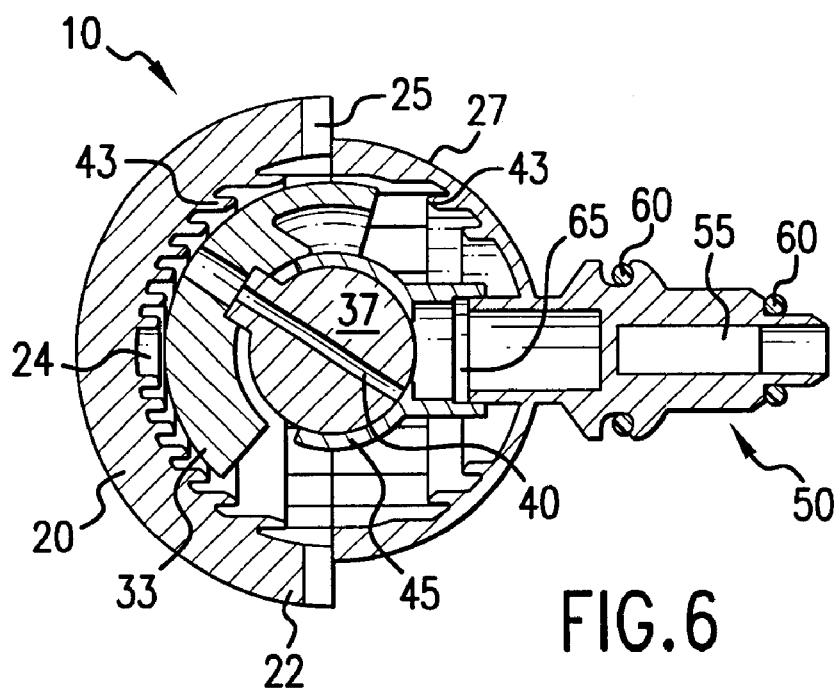
FIG. 6 is a cross-sectional side view of a vent valve according to one preferred embodiment of this invention.

FIG. 6 shows vent valve 10 reaching a critical level of fuel within fuel tank 80 so that valve float 35 forces valve channel 40 into a fully closed position. When vent valve 10 is trapped against a top of fuel tank 80, valve channel 40 and thus valve 30 is forced in the fully closed position.

Figure 7:
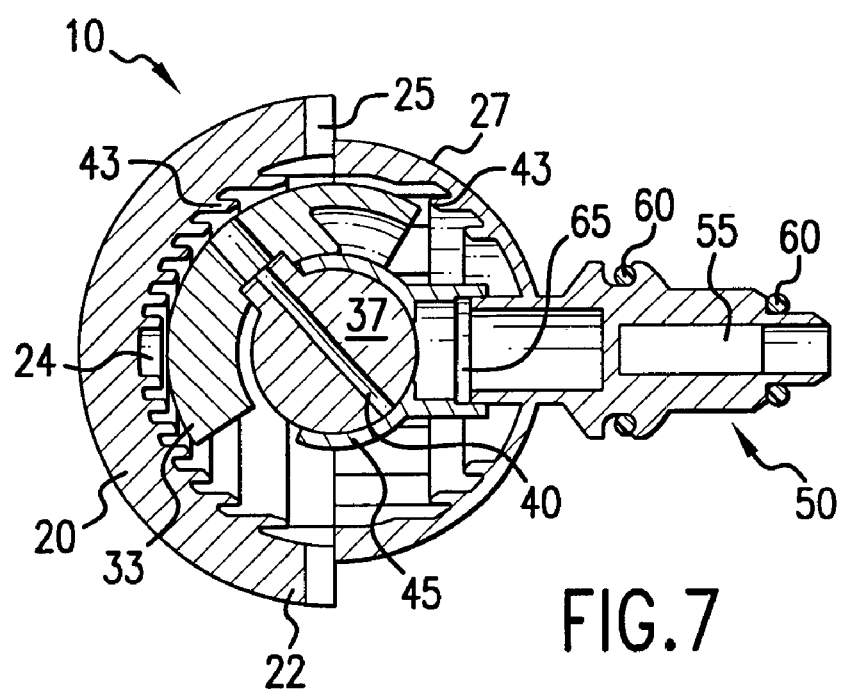
FIG. 7 is a cross-sectional side view of a vent valve according to one preferred embodiment of this invention.

FIG. 7 shows vent valve 10 when fuel tank 80 is in an overfill condition. The overfill condition may occur during a roll-over event. A secure cut-off condition is preferably obtained in the overfill condition. A lower end of valve channel 40 within valve 30 is preferably open to a side of an inner chamber between floating body 20 and valve 30 to allow fuel to drain before valve 30 rotates into the closed position.

In operation, fuel tank 80 is vented by vent valve 10 when vapor is discharged through valve 30 from an interior of fuel tank 80 to an exterior of fuel tank 80, preferably through sending unit 85 or similar preexisting component positioned through a sidewall of fuel tank 80. Vapor is preferably discharged through vent hose 70 that tethers vent valve 10 with respect to the sidewall of fuel tank 80. Valve 30 rotates within floating body 20 based upon an angle of a fuel level within fuel tank 80. When fuel tank 80 becomes inverted or otherwise distressed within a predetermined tolerance, valve 30 closes relative to floating body 20, thus stopping fuel and/or vapor discharge through vent 65/vent hose 70. Just prior to valve 30 obtaining the closed position, a small amount of fuel present in valve channel 40 is drained from valve 30 and into fuel tank 80.

While in the foregoing specification this invention has been described in relation to certain preferred embodiments thereof, and many details have been set forth for purpose of illustration, it will be apparent to those skilled in the art that the vent valve according to this invention is susceptible to additional embodiments and that certain of the details described herein can be varied considerably without departing from the basic principles of the invention.

We claim:

1. A vent valve for a fuel tank comprising:
   a floating body;
   a valve rotatably positioned within the floating body;
   a vent positioned with respect to the floating body; and
   a vent hose positioned with respect to the vent, the vent forming a vapor path between the valve and the vent hose.

2. The vent valve of claim 1 wherein the floating body includes a plurality of channels positioned between the floating body and the valve.

3. A vent valve for a fuel tank comprising:
   a floating body;
   a valve positioned within the floating body, wherein the valve comprises:
      a valve float rotatably positioned within the floating body; and
      a valve channel positioned within the valve float;
   a vent positioned with respect to the floating body; and
   a vent hose positioned with respect to the vent, the vent forming a vapor path between the valve and the vent hose.

4. The vent valve of claim 3 wherein the valve further comprises:
   a valve seat fixed with respect to the floating body, the valve seat permitting the rotation of the valve float with respect to the floating body.

5. A vent valve for a fuel tank comprising:
   a floating body;
   a valve positioned within the floating body, wherein the valve is freely rotatable within the floating body and positionable between an open position and a closed position;
   a vent positioned with respect to the floating body; and
   a vent hose positioned with respect to the vent, the vent forming a vapor path between the valve and the vent hose.

6. The vent valve of claim 5 wherein one of the valve and the floating body includes a plurality of baffles to permit passage of vapor from an exterior of the vent valve to an interior of the vent valve.

7. A vent valve for a fuel tank having a sending unit positioned therethrough, the vent valve comprising:
   a floating body floatable within the fuel tank;
   a valve positioned within the floating body, the valve rotatable within the floating body and positionable between an open position and a closed position; and
   a vent hose positioned with respect to the valve, the vent hose extending between the floating body and the sending unit.

8. The vent valve of claim 7 wherein the valve comprises:
   a valve float rotatably positioned within the floating body; and
   a valve channel positioned within the valve float.

9. The vent valve of claim 8 wherein the valve float comprises a ball integrated with a floatable cap.

10. A vent valve for a fuel tank having a sending unit positioned therethrough, the vent valve comprising:
    a floating body floatable within the fuel tank;
    a plurality of baffles positioned within the floating body;
    a valve positioned within the floating body; and
    a vent hose positioned with respect to the valve, the vent hose extending between the floating body and the sending unit.

11. A method for venting a fuel tank comprising:
    floating a valve in the fuel tank;
    tethering the valve with respect to a sidewall of the fuel tank;
    rotating the valve within a floating body based upon an angle of a fuel level within the fuel tank; and
    discharging vapor through the valve from an interior of the fuel tank to an exterior of the fuel tank.

12. The method of claim 11 wherein the vapor is discharged through a vent hose that tethers the valve.

13. The method of claim 11 further comprising:
    permitting a two way exchange of pressure between the interior of the fuel tank and the exterior of the fuel tank.

14. A method for venting a fuel tank comprising:
    floating a valve in the fuel tank;
    tethering the valve with respect to a sidewall of the fuel tank;
    discharging vapor through the valve from an interior of the fuel tank to an exterior of the fuel tank; and
    closing the valve when the fuel tank becomes inverted.

15. The method of claim 14 further comprising:
    draining gasoline from the valve before closing the valve.

* * * * *